United States Patent

Krause et al.

[15] 3,652,213

[45] Mar. 28, 1972

[54] PROCESS FOR THE PREPARATION OF AN ANHYDRIDE OF TRIVALENT PHOSPHORUS

[72] Inventors: Horatio H. Krause; Justin S. McNulty, both of Columbus; Robert E. Hall, Wyoming, all of Ohio

[73] Assignee: The Procter & Gamble Company, Cincinnati, Ohio

[22] Filed: Sept. 25, 1969

[21] Appl. No.: 861,164

[52] U.S. Cl..............................23/165, 204/157.1, 204/164
[51] Int. Cl....................................C01b 25/12, C01b 25/00
[58] Field of Search...........23/165 A, 202; 204/164, 157.1 H

[56] References Cited

UNITED STATES PATENTS

| 3,438,720 | 4/1969 | Cleaver | 23/1 |
| 3,501,262 | 3/1970 | Arkless et al. | 23/21 |
| 3,532,461 | 10/1970 | Whyte et al. | 23/165 |

Primary Examiner—Oscar R. Vertiz
Assistant Examiner—Gregory A. Heller
Attorney—Julius P. Filcik

[57] ABSTRACT

A process for the preparation of an anhydride of trivalent phosphorus comprising subjecting elemental phosphorus to a plasma stream of thermally- and electronically-excited carbon dioxide is disclosed. The anhydride of trivalent phosphorus is useful as an intermediate in the preparation of detergency builders for use in detergent compositions.

8 Claims, No Drawings

3,652,213

PROCESS FOR THE PREPARATION OF AN ANHYDRIDE OF TRIVALENT PHOSPHORUS

FIELD OF THE INVENTION

This invention relates to a process for the preparation of phosphorus compounds. More particularly, this invention relates to a process for the preparation of an anhydride of trivalent phosphorus from elemental phosphorus and carbon dioxide. This invention also relates to the process for the preparation of an anhydride of trivalent phosphorus from elemental phosphorus and carbon dioxide using a heretofore-unknown synthetic technique.

BACKGROUND OF THE INVENTION

Methods for the preparation of the anhydride of trivalent phosphorus, phosphorus trioxide, are not numerous and only recently have methods for preparing phosphorus trioxide on a commercial scale been developed. A known laboratory method of preparing phosphorus trioxide by burning phosphorus in oxygen is described by Wolf and Schmager, Chem. Ber., 62, 771-786 (1929). The yield of phosphorus trioxide obtained by the procedure of Wolf et al., supra, rarely exceeds about 50 percent and is usually substantially less than that amount. In addition using the procedure described by Wolf et al., supra, by-products consisting largely of $P_4O_{10}$, red phosphorus and the like are formed in large quantities.

Heinz and Thilo (German Democratic Republic Patent No. 26,660) have also reported a method of preparing trioxide by reacting phosphorus pentoxide with $N_2O$ but by-products are present in the yields of the desired product.

A method for preparing phosphorus trioxide is also disclosed in U.S. Pat. No. 3,532,461. This process comprises reacting elemental phosphorus, oxygen, and at least one carbon oxide at a temperature in excess of 1,500° C. until substantially complete equilibrium is achieved. This process is an improvement in the art of producing trivalent phosphorus compounds over those methods known in the art and the yields of trivalent phosphorus are greater than those previously obtained in the art.

The methods for preparing phosphorus trioxide described above involve typically chemical techniques in which phosphorus trioxide is prepared by burning phosphorus in the presence of oxygen or of reducing phosphorus pentoxide in the presence of a chemical reductant.

The copending application of Eugene J. Mezey and Robert E. Hall, Ser. No. 861,159, filed Sept. 25, 1969, for Process for the Preparation of An Anhydride of Trivalent Phosphorus Using Electronically-Excited Carbon Dioxide or Nitric Oxide, involves the production of phosphorus trioxide from elemental phosphorus by subjecting elemental phosphorus to a plasma stream of an electronically-excited gas. The electronically-excited gas is characterized as a stream of carbon dioxide or nitric oxide irradiated with electromagnetic energy in the microwave range. The electronically-excited gas causes a reaction to occur whereby phosphorus trioxide is prepared from elemental phosphorus.

The copending application of Allen K. Reed, William M. Goldberger, and David D. Whyte, Ser. No. 860,776, filed Sept. 24, 1969, for Process for the Preparation of An Anhydride of Trivalent Phosphorus, accomplishes the synthesis of phosphorus trioxide using a dc plasma jet, a departure from the known chemical methods of synthesis. This process involves the reaction of an anhydride of pentavalent phosphorus with a reductant, such as carbon monoxide, in a reaction zone at a temperature of from 1,500° K. to about 20,000° K. These temperatures in the reaction zone are achieved using an inert gas plasma flame obtained by discharging a direct current through a stream of argon or helium.

The copending application of Eugene J. Mezey, Ser. No. 861,145, filed Sept. 25, 1969, for Process for the Preparation of an Anhydride of Trivalent Phosphorus using Excited Helium, is another approach for the preparation of an anhydride of trivalent phosphorus and involves the subjection of an anhydride of pentavalent phosphorus to a plasma stream of electronically-excited helium, obtained by irradiating a stream of helium with electromagnetic energy in the microwave range. The plasma stream of electronically-excited helium provides the energy necessary to dissociate the anhydride of pentavalent phosphorus into the anhydride of trivalent phosphorus and oxygen. The anhydride of trivalent phosphorus is simply separated from the oxygen produced.

The preparation of compounds in which the phosphorus atom exists in the +3 oxidation state has been rendered difficult, in part, by the complex nature of the phosphorus atom. The phosphorus atom can exist in compounds in which the oxidation state of the phosphorus atom can exist in ranges from −3, as in phosphine ($PH_3$), to +5, as in phosphoric acid ($H_3PO_4$), pyrophosphoric acid ($H_4P_2O_7$), phosphate salts ($M_4PO_4$), and metaphosphate salts ($MPO_3$). Compounds in which phosphorus atoms exist in an oxidation state intermediate between −3 and +5 are also known, e.g., phosphorus monoxide ($P_2O$), phosphite salts ($M_3PO_3$), hypophosphoric acid ($H_4P_2O_6$), and the like. Thus, methods of preparing phosphorus compounds having a particular oxidation state intermediate between −3 and +5 are either quite specific or are not numerous.

The known approaches to the preparation of compounds in which the phosphorus atom exists in the +3 oxidation state have involved the use of extremely high temperatures to achieve the reaction of elemental phosphorus with oxygen or the reduction of $P_4O_{10}$ to a lower oxide of phosphorus, e.g., $P_4O_6$.

Accordingly, it is an object of this to prepare an anhydride of trivalent phosphorus using a herein-before-unknown technique unlike the typical chemical syntheses previously known.

In addition, it is an object of this invention to prepare an anhydride of trivalent phosphorus from elemental phosphorus using thermally and electronically-excited carbon dioxide whereby both high temperatures and electromagnetic energy provide the energy necessary to cause the reaction of elemental phosphorus with carbon dioxide.

In addition, it is an object of this invention to prepare an anhydride of trivalent phosphorus in pure form.

Also, it is an object of this invention to convert known and commonly available elemental phosphorus into a valuable and useful anhydride of trivalent phosphorus. The anhydride of trivalent phosphorus is a valuable intermediate useful in the preparation of detergency builders for use in detergent compositions. For example, the anhydride of trivalent phosphorus can be used in preparing ethane-1-hydroxy-1,1-diphosphonic acid and its salts, which are valuable builders for use in detergent compositions, as described by Francis L. Diehl in U.S. Pat. No. 3,159,581, patented Dec. 1, 1964. In addition the anhydride of trivalent phosphorus is useful in the preparation of phosphorus acid of known utility simply by mixing the anhydride of trivalent phosphorus with water.

Additionally, it is an object of this invention to provide a process for the preparation of an anhydride of trivalent phosphorus from elemental phosphorus and carbon dioxide, both well known and commonly available materials, using an externally modern technological approach and a heretofore-unknown process.

SUMMARY OF THE INVENTION

The objects of this invention are achieved according to the process described herein. This heretofore-unknown process for preparing an anhydride of trivalent phosphorus comprises (1) forming a plasma stream comprising thermally- and electronically-excited carbon dioxide at a temperature of from 1,500° K. to 20,000° K. in a reaction zone, said plasma stream being characterized as the product obtained on irradiating a stream of carbon dioxide with electromagnetic energy having a frequency of 0.75 megaHertz to 25 megaHertz; (2) contacting elemental phosphorus with the plasma stream of thermally- and electronically-excited carbon dioxide in the reaction zone to form an equilibrium mixture containing an anhydride of trivalent phosphorus; (3) cooling the equilibrium mixture formed in Step (2) in a quench chamber at a temperature of below 800° K.; and (4) separating the anhydride of trivalent phosphorus. This new and novel process allows the reaction product to be obtained rapidly, efficiently, and in essentially pure form.

More specifically, the process of this invention for the preparation of an anhydride of trivalent phosphorus comprises contacting elemental phosphorus with a plasma stream of electronically and thermally-excited carbon dioxide whereby the phosphorus is oxidized to an anhydride of trivalent phosphorus due to the presence of an active oxygen species using energy supplied by the thermally- and electronically-excited carbon dioxide.

The anhydride of trivalent phosphorus produced by the process of this invention can then be separated from the reaction products obtained from the carbon dioxide simply by conventional and well-known techniques. Subsequently the anhydride of trivalent phosphorus can be used to prepare useful compounds, as for example, ethane-1-hydroxy-1,1-diphosphonic acid, and its salts, as hereinbefore mentioned.

In the process described herein, an anhydride of trivalent phosphorus is produced. As used herein, the term anhydride of trivalent phosphorus and the term phosphorus trioxide are intended to encompass $P_4O_6$, $P_2O_3$ (historically and conventionally used as the formula for phosphorus trioxide), and $(P_2O_3)$. Hereinafter the term anhydride of trivalent phosphorus, phosphorus trioxide, $P_2O_3$ and $P_4O_6$ are used interchangeably and designate the oxide of phosphorus in which the phosphorus atom is in a +3 oxidation state. The term plasma stream of thermally- and electronically-excited carbon dioxide at a temperature of from 1,500° K. to 20,000° K. as used herein designates the product of irradiating a stream of carbon dioxide to electromagnetic energy having a frequency in the radio frequency range, e.g., from 0.75 megaHertz to 25 megaHertz.

DETAILED DESCRIPTION OF THE INVENTION

In the process described above phosphorus trioxide is produced by contacting elemental phosphorus with a plasma stream comprising thermally- and electronically-excited carbon dioxide. The process of this invention for the preparation of an anhydride of a reaction zone of suitable design and from appropriate materials to accomplish the objects of this invention.

The plasma stream of thermally- and electronically-excited carbon dioxide used in reaction zone can be obtained in the manner described hereinafter. An inert gas stream is passed through the core of a coil energized with electromagnetic energy in the radio-frequency range. An inert gas plasma is initiated by introducing a graphite ring, having a radial gap of from one-sixteenth to one-eighth inch in width, into the electromagnetic field formed by the coil. The graphite ring coupled with the electromagnetic field results in the formation of an arc across the gap in the graphite ring. The arc causes an ionization of the inert gas resulting in the formation of the plasma. The electromagnetic energy allows the plasma to be self-sustaining once initiated and once the plasma stream is formed the graphite ring can be removed from the plasma area. Other starting devices can be used where desired, e.g., refractory conductor coils of tungsten, molybdenum and tantalum having gaps approximately one-sixteenth to one-eighth inch apart across which an arc can be generated. A flow-stabilized steady state is created resulting in the formation of a plasma stream having a temperature of from 1,500° K. to 20,000° K.

The technology of plasmas and the production of plasmas to generate temperatures of from 1,500° K. to 20,000° K. are relatively new having been described in the literature only in the past several years. A number of articles on generating a plasma flame and on plasma technology are available describing the use of plasma flames to achieve chemical syntheses not possible by conventional means or typically chemical techniques. The plasma flame with its characteristics and its uses is described in the following: Melvin B. Gottleib, International Science & Technology, pp. 44-50, Aug., 1965; Hans W. Leutner and Charles S. Stokes, Industrial & Engineering Chemistry, 53, pp. 341-342 (May, 1961); Hans W. Leutner, I&EC Process Design and Development, 1, pp. 166-168 July, 1962); Charles S. Stokes, Chemical Engineering, pp. 191-194, 196, Apr., 1965; C. A. Papp, Chemical Engineering Process, 59, pp. 51-53 (June, 1963); Masao Sugaware et al., U.S. Pat. No. 3,192,427, patented June 29, 1965, for Plasma Flame Generator; Industrial and Engineering Chemistry, 55, pp. 16-23 (Jan., 1963); C. S. Stokes and W. W. Knipe, Industrial & Engineering Chemistry, 52, 287-288 (Apr., 1960); and Thomas B. Reed, International Science & Technology, pp. 42-48, 76 (June, 1962).

In forming the plasma stream used in the process of this invention, an inert gas plasma stream is established by passing electromagnetic energy in the radio-frequency range through the stream of inert gas. The frequency of the electromagnetic energy used can range from 0.75 megaHertz to 25 megaHertz, preferably from 2 megaHertz to 6 megaHertz. Commercially available equipment can be used to produce the electromagnetic energy needed. For example, radio frequency generators of the type used for induction heating are commercially available and can be used to produce electromagnetic energy. In these commercially available systems the energy is produced and conducted through extensions to the energized coil in the area of gas plasma formation. Creation of the inert gas plasma stream produces a stream of highly excited inert gas atoms and generates temperatures in the reaction zone of from 1,500° K. to 20,000° K. Use of the electromagnetic energy permits the plasma stream to operate as a stream of thermally- and electronically-excited inert gas atoms without the need for electrodes which at the high temperatures used can contaminate the plasma stream.

In generating the plasma stream of thermally- and electronically-excited carbon dioxide having the high temperature characteristics of the plasma flames described above and used in the process of this invention a plasma stream of an inert gas such as argon or helium is formed as described above using electromagnetic energy in the radio frequency range. The inert gas is generally passed through the plasma forming area at a pressure of from about 0.5 atmosphere to about 2 atmospheres. A pressure of about 1 atmosphere is just slightly above (e.g., from about 1 atmosphere to 1.1 atmospheres) is generally used. The gas is passed through the reaction zone at a flow rate of from 5 to 25 standard cubic feet per minute per square foot of reaction cross section area (scfmf), preferably from 8 to 15 standard cubic feet per minute per square foot of reaction zone cross-sectional area. The gas pressure and gas flow rate through the reaction zone can be monitored and controlled using conventional pressure gauges, flow meters and valve systems. The plasma stream of thermally- and electronically-excited carbon dioxide is formed by supplanting some of the inert gas stream with carbon dioxide. Increasing amounts of carbon dioxide can be used with a corresponding reduction in the amount of inert gas removed from the stream. Where desired, once the plasma stream is formed the inert gas used can be totally replaced by carbon dioxide. Where carbon dioxide and an inert gas are used the weight ratio of carbon dioxide to inert gas suitable for generating the plasma stream can range from 0.01 to 1000:1, preferably from 0.4:1 to 3:1.

The temperatures generated in the reaction zone by the plasma stream of thermally- and electronically-excited carbon dioxide can range from 1,500° K. to 20,000° K., preferably from 3,000° K. to 12,000° K. These temperatures in the reaction zone are used to operate the process of this invention. Within this temperature range the temperature of operation is not critical. Use of the above-described temperature permits the rapid establishment of an equilibrium between reactants and products. Use of temperatures below 1,500° K. results in poor yields. Higher temperatures than 20,000° K. are generally not required and necessitate the use of equipment compatible with these higher temperatures.

In the process of this invention, the temperatures in the reaction zone are sufficient to cause a reaction between the starting materials, elemental phosphorus and carbon dioxide, to obtain the products, the anhydride of trivalent phosphorus and carbon monoxide. A better understanding of the process of this invention can be obtained upon considering the following. While not desiring to be bound by theory, it is believed that carbon dioxide in the plasma stream gains energy as a result of the high temperature and the irradiation of electromagnetic energy. The energy gained by carbon dioxide results in the formation of excited species, e.g., atoms and molecules having energies higher than those of the ground states. In the case of the polyatomic gases such as carbon dioxide it is believed that the energetic species formed in the plasma stream comprise not only excited species of the polyatomic gas, but also the gas itself is dissociated into various components, molecular fragments, and the like, each of which has a considerably higher energy level than that of the same material in its ground state. The electronically-excited and thermally-excited species upon collision causes the elemental phosphorus to react with the carbon dioxide to form phosphorus trioxide. The process of this invention in its broadest aspects is the transmission of sufficient energy from the plasma stream to cause the reaction of the phosphorus with the carbon dioxide.

In the process of this invention, the thermally electronically-excited carbon dioxide produced in the plasma flame contains sufficient energy to cause a reaction with elemental phosphorus to obtain the products, the anhydride of trivalent phosphorus and carbon monoxide. As with most reactions, an equilibrium between reactants and products is established within the reaction zone. The equilibrium which is established in the process of this invention results from the use of high temperatures employed in the reaction zone and in addition the energy supplied by the irradiating of the plasma stream with electromagnetic energy. While not desiring to be bound by theory, it is believed that some of the carbon-oxygen bonds in the carbon dioxide are disrupted resulting in the formation of free oxygen which can subsequently react with the elemental phosphorus present forming the anhydride of trivalent phosphorus. At the temperatures in the reaction zone and the presence of the added electromagnetic radiation, the reverse of the reaction takes place in which the product, the anhydride of trivalent phosphorus, can dissociate into elemental phosphorus and oxygen with the oxygen subsequently reacting with the carbon monoxide reforming the starting materials. Although the above discussion for the sake of simplicity has been described as a stepwise process, forward to form the products and reverse to form the reactants, at the temperatures used in the reaction zone in the process of this invention the establishment of an equilibrium between reactants and products in which the rate of formation of the products is equal to the rate of formation of reactants is essentially instantaneous. The products of the process of this invention are obtained by quenching the equilibrium established by passing the gases in the reaction zone into a quench chamber at a considerably lower temperature than is used in the reaction zone. By lowering the temperature quickly the reverse reaction, i.e., the reversion of the products to starting materials is minimized. The temperatures used in the reaction zone followed by a quick quenching step permit the formation of the anhydride of trivalent phosphorus efficiently, in good yields and in essentially pure form.

The time necessary for equilibrium between reactants and products to be achieved in the reaction zone before the effluent gases are passed into the quench chamber is normally quite short since at the high temperatures used in the reaction zone equilibrium between reactants and products is reached essentially instantaneously. The residence time in the reaction zone necessary to achieve equilibrium will generally be from 0.5 milliseconds to 5 milliseconds, more normally from about 1 millisecond to about 3 milliseconds.

Subsequent to the reaction of the starting materials in the reaction zone is the cooling of the products in the quench chamber to prevent reversion to starting material. The equilibrium is quenched by passing the effluent gases from the reaction zone into a quenching chamber at a temperature of less than 800° K., preferably less than 500° K. Cooling the effluent gases from the reaction zone in the quench chamber freezes the equilibrium preventing the reformation of reactants.

To obtain the advantages of the process of this invention, the effluent gas from the reaction zone is quickly cooled in a quench chamber to a temperature of below 800° K. The cooling is usually accomplished within less than 3 seconds, preferably less than 1 second, to obtain the products of the process of this invention efficiently and in good yield. Once the gases from the reaction zone are cooled to below this temperature the equilibrium between reactants and products is frozen and essentially no additional reaction occurs to form the products or to reform the reactants. The gases in the quench chamber can then be separated using conventional techniques to obtain the products. Any starting material recovered can be recycled through the reaction zone to increase the yield of the anhydride of trivalent phosphorus and to improve the economics of the process of this invention.

The quenching chamber used to cool the effluent gases emerging from the reaction zone can be of any construction or design. All that is necessary is that the quenching chamber cool the effluent gases quickly to a temperature of less than 800° K. and preferably less than 500° K. to "freeze" the equilibrium and obtain the reaction product. The quenching chamber can be cooled using jackets through which refrigerants, water, air and the like are passed. Suitable quench chambers can be designed or selected by one skilled in the art to achieve the cooling of the effluent gases to below the temperatures above specified without departing from the spirit and scope of this invention.

The determination of the optimum conditions for operation of the process of this invention for a specific set of reaction conditions, e.g., reactant flow rate, reaction zone temperature, reactant feed ratios, quench chamber temperatures, inert gas/carbon dioxide weight ratios and plasma stream flow rate is within the skill of one knowledgeable in the art and can be accomplished by analysis of the reaction products obtained, for example, by analyzing the effluent gas from the quench chamber for the amount of carbon monoxide present, and making the appropriate adjustments. For example, where the amount of carbon monoxide is low, the amount of phosphorus trioxide is low and a higher reaction zone temperature or a higher carbon dioxide/phosphorus feed ratio can be used to permit the formation of more phosphorus trioxide.

Once the gases have been cooled in the quench chamber, the products of the process are simply separated from the reactants. For example, the effluent gas from the quench chamber is passed through a cold trap or a series of cold traps, e.g., at a temperature of below about 30° C., and condensed. The unreacted carbon dioxide, carbon monoxide, and inert gas are vented from the system. The contents of the cold traps can be washed with an organic solvent such as benzene, toluene or xylene to dissolve the phosphorus trioxide and any unreacted phosphorus; and the phosphorus trioxide can be separated by distillation. The anhydride of trivalent phosphorus produced by the process of this invention and collected as above is obtained in a good yield, e.g., approximately 50 percent and essentially pure, e.g., 95–100 percent.

The product of the process of this invention, phosphorus trioxide, is valuable as an intermediate in the preparation of known builders for use in detergent compositions. For example, ethane-1-hydroxy-1,1-diphosphonic acid, and the salts thereof, can be prepared from the phosphorus trioxide obtainable from the process of this invention. The use of ethane- 1-hydroxy-1,1-diphosphonic acid, and its salts, as builders in detergent compositions is described by Diehl, supra.

The following examples are illustrative of the present invention and they are not intended in any way to limit the full scope of the invention as described herein.

EXAMPLE I

Preparation of $P_4O_6$

APPARATUS

The apparatus comprised a plasma generator, a reaction zone, equipment for generating electromagnetic energy in the radio frequency range, a phosphorus vaporizer, a quench chamber and a phosphorus trioxide recovery system.

The reaction zone comprised the upper portion of a vertically oriented fused silica reaction tube, 2.5 inches in diameter and 18 inches in length. The lower portion of the fused silica tube was used as a quenching chamber. The equipment for generating electromagnetic energy in the radio-frequency range comprised a 10-kilowatt radio-frequency wave generator. (Westinghouse Style 7505678G14).

A plasma generator, comprising a fused silica gas inlet tube, 1 inch in diameter and 6 inches in length, through which the plasma forming gas was passed, was connected to the reaction zone at the top. An electric coil through which electromagnetic energy could be passed surrounded the gas inlet tube at the connection of the plasma generator to the reaction zone.

The phosphorus vaporizer comprised a graphite container, cylindrical in shape and tapered to a point, within a quartz tube, which was connected to the side of the reaction zone just below the plasma generator. The cylindrical portion of the graphite container was heated with a resistance furnace and the conically tapered end was heated inductively. A carrier gas inlet tube was connected to the graphite cylinder for providing a carrier gas to sweep the phosphorus vapors into the reaction zone.

The quench chamber comprised the lower portion of the fused silica reaction tube and was connected to the phosphorus separation and recovery system.

The phosphorus separation and recovery system comprised a series of cold traps cooled with a dry-ice/acetone slurry for condensing out the phosphorus trioxide formed and a system for venting gaseous reaction by-products. Analysis for phosphorus trioxide was performed by the method of Jones & Swift, Anal. Chem., 25, 1272–4 (1953).

GENERAL OPERATING PROCEDURE

To initiate the plasma flame, a flow of argon (8 to 9 liters/min.) was passed through the core of the coil, which was energized by passing electromagnetic energy of about 4 megaHertz through the coil. A small graphite ring, with a one-sixteenth inch gap, was moved into the middle of the electromagnetic field. Electrical coupling of the ring to the electromagnetic field caused an arc to form across the one-sixteenth inch gap. With the arc as an initiator, an electrodeless plasma flame was established. Once the plasma was established the graphite ring was removed from the field of the coil. The argon flow was gradually supplanted by the carbon dioxide to be used as the plasma forming gas.

Once the carbon dioxide plasma flame had been established, argon was passed through the phosphorus vaporizer, to sweep phosphorus vapor into the reaction zone. The gases from the reaction zone were passed into the quench zone and into the phosphorus trioxide separation and recovery system. The condensate obtained in the cold trap was dissolved in benzene to remove any unreacted phosphorus and distilled to recover the phosphorus trioxide.

Preparation of Phosphorus Trioxide

Phosphorus (25 g. charge) was placed in the phosphorus vaporizer and the entire system was purged with argon. A carbon dioxide plasma flame was generated in the reaction zone as described above using electromagnetic energy of 4 megaHertz. Phosphorus vapor from the phosphorus vaporizer, heated to 142° C. to 164° C., was swept into the reaction zone, at a pressure of 15.3 to 41.6 mm.Hg, by passing argon through the phosphorus vaporizer to obtain 0.000216–0.000909 gram-atoms of phosphorus per minute. The effluent gases from the reaction zone were passed through the quench chamber at about 700° K. and into the phosphorus trioxide recovery system. The apparatus was operated for 80–90 minutes. The condensate obtained in the cold trap was dissolved in benzene and distilled. A 49 percent yield of phosphorus trioxide was obtained.

EXAMPLE II

Preparation of Phosphorus Trioxide

The procedure described in Example I was repeated except that the temperature of phosphorus vaporizer was increased to 215° C., the pressure was increased to 180 mm.Hg, the phosphorus feed rate increased to 0.0062 gram-atoms per minute, and the time of the run was reduced to 60 minutes. A 36 percent yield of phosphorus trioxide was obtained.

What is claimed is:

1. A process for the preparation of an anhydride of trivalent phosphorus which comprises:
    1. forming a plasma stream comprising thermally- and electronically-excited carbon dioxide at a temperature of from 1,500° K. to 20,000° K. in a direction zone, said plasma stream being characterized as the product obtained on irradiating a stream of carbon dioxide with electromagnetic energy having a frequency of from 0.75 megaHertz to 25 megaHertz;
    2. contacting elemental phosphorus with the plasma stream of thermally- and electronically-excited carbon dioxide in the reaction zone to form an equilibrium mixture containing an anhydride of trivalent phosphorus;
    3. cooling the equilibrium formed in Step (2) in a quench chamber at a temperature of below 800° K.; and
    4. separating the anhydride of trivalent phosphorus.

2. The process of claim 1 wherein the frequency is from 2 megaHertz to 6 megaHertz.

3. The process of claim 2 wherein the reaction zone is at a temperature of from 3,000° K. to 12,000° K. and wherein the cooling of the equilibrium mixture in Step (3) is in less than 3 seconds.

4. The process of claim 3 wherein the quench chamber is at a temperature less than 500° K. and wherein the cooling of the equilibrium mixture in Step (3) is in less than 1 second.

5. The process of claim 4 wherein the molar ratio of phosphorus to carbon dioxide is from 1:6 to 1:1000.

6. The process of claim 5 wherein the molar ratio of phosphorus to carbon dioxide is from 1:6 to 1:30.

7. The process of claim 2 wherein the plasma stream of thermally- and electronically-excited carbon dioxide also contains an inert gas selected from the group consisting of argon and helium in a weight ratio to the carbon dioxide of from 0.01:1 to 1000:1.

8. The process of claim 7 wherein the reaction zone is at a temperature of from 3,000° K. to 12,000° K. and wherein the inert gas is argon.

* * * * *

PO-1050
(5/69)

UNITED STATES PATENT OFFICE
CERTIFICATE OF CORRECTION

Patent No. 3,652,213　　　　　　　Dated　March 28, 1972

Inventor(s)　Horatio H. Krause, Justin S. McNulty and Robert E. Hall

It is certified that error appears in the above-identified patent and that said Letters Patent are hereby corrected as shown below:

Column 2, line 13, delete "can exist in".

Column 2, line 31, after "this" insert -- invention --.

Column 2, line 61, "externally" should read "extremely".

Column 3, line 30, "$(P_2O_3)$" should read "$(P_2O_3)_n$".

Column 3, line 47, after "of an anhydride of" insert -- trivalent phosphorus from elemental phosphorus using thermally- and electronically-excited carbon dioxide, $CO_2^*$, can be summarized schematically by the following overall equation:

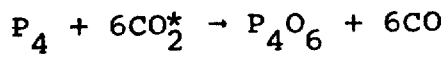

$$P_4 + 6CO_2^* \rightarrow P_4O_6 + 6CO$$

The above schematic equation describes the oxidation of elemental phosphorus with thermally- and electronically-excited carbon dioxide to the anhydride of trivalent phosphorus, $P_4O_6$, with the production of carbon monoxide as a by-product. Molar ratios of phosphorus to carbon dioxide of from 1:6 to 1:1000, preferably from 1:6 to 1:30, are suitable for use in the process of this invention.

The starting materials used in the process of this invention are common and well known. Elemental phosphorus is commercially available. Carbon dioxide can be obtained commercially or can be generated by conventional and well-known techniques. For example, carbon dioxide can be prepared by burning carbon in the presence of oxygen.

(Continued on page 2)

3,652,213

In the process of this invention, phosphorus is contacted with the plasma stream of thermally- and electronically-excited carbon dioxide in a reaction zone. The term reaction zone is used herein to describe the area in which the elemental phosphorus is contacted with the plasma stream of thermally- and electronically-excited carbon dioxide to produce the anhydride of trivalent phosphorus. Any vessel, chamber, or container of any configuration or design is suitable for the use as the reaction zone in the process of this invention. All that is necessary for the operation of the process of this invention is that the reaction zone be designed such that the elemental phosphorus can be contacted with the plasma stream of thermally- and electronically-excited carbon dioxide and such that temperatures of 1500°K. to 20,000°K. generated by the plasma stream can be used. One skilled in the art can select --.

Column 4, line 49, "is" should read "to".

Column 8, line 34, "direction" should read "reaction".

Signed and sealed this 5th day of September 1972.

(SEAL)
Attest:

EDWARD M. FLETCHER, JR.
Attesting Officer

ROBERT GOTTSCHALK
Commissioner of Patents